United States Patent
Sadki et al.

(10) Patent No.: US 10,181,797 B2
(45) Date of Patent: Jan. 15, 2019

(54) VOLTAGE CONVERTER COMPRISING AN ISOLATED DC/DC CONVERTER CIRCUIT

(71) Applicant: Valeo Siemens eAutomotive France SAS, Cergy (FR)

(72) Inventors: Hicham Sadki, Cergy (FR); Larbi Bendani, Meru (FR)

( * ) Notice: Subject to any disclaimer, the term of this patent is extended or adjusted under 35 U.S.C. 154(b) by 0 days.

(21) Appl. No.: 15/320,982

(22) PCT Filed: Jun. 29, 2015

(86) PCT No.: PCT/FR2015/051771
§ 371 (c)(1),
(2) Date: Dec. 21, 2016

(87) PCT Pub. No.: WO2016/001561
PCT Pub. Date: Jan. 7, 2016

(65) Prior Publication Data
US 2017/0163174 A1    Jun. 8, 2017

(30) Foreign Application Priority Data

Jun. 30, 2014  (FR) .................................... 14 56219

(51) Int. Cl.
| H02M 3/335 | (2006.01) |
|---|---|
| H02M 3/156 | (2006.01) |
| H02M 3/337 | (2006.01) |
| H02M 1/08 | (2006.01) |

(Continued)

(52) U.S. Cl.
CPC ......... *H02M 3/33546* (2013.01); *H02M 1/08* (2013.01); *H02M 1/14* (2013.01);
(Continued)

(58) Field of Classification Search
CPC ...... H02M 3/33546; H02M 1/08; H02M 1/14; H02M 2001/0009; H02M 2001/0048
See application file for complete search history.

(56) References Cited

U.S. PATENT DOCUMENTS

| 5,754,413 A | 5/1998 | Fraidlin et al. | |
|---|---|---|---|
| 7,269,034 B2 * | 9/2007 | Schlecht | H02M 3/335 363/21.06 |

(Continued)

FOREIGN PATENT DOCUMENTS

| DE | 10 2011 000 708 A1 | 8/2012 |
|---|---|---|
| EP | 1 763 124 A2 | 3/2007 |
| JP | H08-228486 A | 9/1996 |

OTHER PUBLICATIONS

International Search Report for PCT Serial No. PCT/FR2015/051771 dated Oct. 8, 2015.

(Continued)

*Primary Examiner* — Emily P Pham
(74) *Attorney, Agent, or Firm* — McCormick, Paulding & Huber LLP

(57) ABSTRACT

The invention relates to a voltage converter comprising: an isolated DC/DC converter circuit having at least one first isolation transformer and switches whose opening and closing successions with at least one duty ratio make it possible to transmit energy through the isolated DC/DC converter by way of said first transformer; a circuit for regulating the input voltage of the isolated DC/DC converter circuit; the regulating circuit being configured to control the output voltage of the isolated DC/DC converter circuit by modifying the voltage delivered to the isolated DC/DC converter circuit, the duty ratio of the isolated DC/DC converter circuit remaining constant, and in said converter, the output of the regulating circuit is connected to a branch of the isolated DC/DC converter circuit comprising said first transformer.

20 Claims, 7 Drawing Sheets

(51) Int. Cl.
*H02M 1/14* (2006.01)
*H02M 3/158* (2006.01)
*H02M 3/28* (2006.01)
*H02M 1/00* (2006.01)

(52) U.S. Cl.
CPC ......... *H02M 3/156* (2013.01); *H02M 3/3376* (2013.01); *H02M 3/33592* (2013.01); *H02M 3/1588* (2013.01); *H02M 3/285* (2013.01); *H02M 2001/007* (2013.01); *H02M 2001/0009* (2013.01); *H02M 2001/0048* (2013.01); *H02M 2001/0058* (2013.01); *H02M 2003/1586* (2013.01); *Y02B 70/1466* (2013.01); *Y02B 70/1475* (2013.01); *Y02B 70/1491* (2013.01)

(56) References Cited

U.S. PATENT DOCUMENTS

| | | | | |
|---|---|---|---|---|
| 8,344,710 | B2* | 1/2013 | Sriram | H02M 3/28 323/222 |
| 9,231,488 | B2* | 1/2016 | Zhu | H02M 1/10 |
| 2011/0026282 | A1* | 2/2011 | Chapman | H02J 3/38 363/65 |
| 2013/0336017 | A1 | 12/2013 | Uno et al. | |

OTHER PUBLICATIONS

Marian K. Kazimierczuk: "Chapter 13: Current-mode Control" In: "Pulse-Width Modulated DC-DC Power Converters", Sep. 16, 2008 (Sep. 16, 2008), John Wiley & Sons, Ltd., U.K., XP055174330, ISBN: 978-0-47-069464-0 pp. 511-570, DOI:10.1002/9780470694640.ch13, the whole document.

James P. Johnson: "Chapter 11: DC-DC Converters" In: "Handbook of Automotive Power Electronics and Motor Drives", 2005, CRC Press, XP055174704, ISSN: 2155-5192 ISBN: 978-1-42-002815-7 pp. 231-254, DOI: 10.1201/9781420028157.pt3, Section 11.3.

* cited by examiner

VOLTAGE CONVERTER COMPRISING AN ISOLATED DC/DC CONVERTER CIRCUIT

CROSS-REFERENCE TO RELATED APPLICATIONS

This application is a National Stage application of International Patent Application No. PCT/FR2015/051771 filed on Jun. 29, 2015, which claims priority to French Patent Application 1456219 filed Jun. 30, 2014, each of which is hereby incorporated by reference in its entirety.

TECHNICAL FIELD

The present invention relates to a voltage converter comprising an isolated DC/DC converter circuit, to a voltage converter device comprising an interlacing of converters according to the invention, as well as to a voltage conversion method used with the converter according to the invention.

BACKGROUND ART

Isolated DC/DC (direct current/direct current) converters can have zero voltage switching (ZVS), or zero current switching (ZCS), making it possible to reduce the switching losses during voltage conversion. These converters are thus particularly advantageous in a car application where the energy resource is limited. In a vehicle, one can use a voltage converter to adapt the voltage levels between several electrical networks of the vehicle or to convert a voltage between an energy source and an electrical consumer on board the vehicle.

An isolated DC/DC voltage converter is known from U.S. Pat. No. 5,754,413 and illustrated in FIG. 1. The converter comprises two switches in a half-bridge arrangement, which are connected at their midpoint to a branch which comprises two series-connected transformers. The switches control the transmission of energy through the transformers in order to achieve conversion of an input voltage of the converter into an output voltage. Diodes connected to the secondary windings of the transformers make it possible to rectify the output signal. The output voltage is obtained by controlling the duty ratio of the switches. By modifying the duty ratio to achieve a target output voltage value, one adjusts the gain of the converter in order to reach the target value of the output voltage. In particular, when the input voltage of the isolated DC/DC converter varies, it is known to vary the duty ratio of the switches of the isolated DC/DC converter in order to regulate its output voltage, that is to say to maintain its output voltage at a desired value.

However, the voltage stress of the rectifying diodes is a function of the duty ratio of the switches of the converter. This stress can become high, when the duty ratio approaches 0% or 100%. To limit the voltage stress of the rectifying diodes, respective transformation ratios that are different for the two transformers are provided. However, this complicates the design of the converter, since the transformers cannot be identical, and the current in the secondary winding presents discontinuities.

In addition, by working with a variable duty ratio, the ripples of the output current can vary strongly, resulting in variation of the yield of the converter. To preserve operation with good yield, the variability of the duty ratio must be low. However, in a vehicle, the voltage of an energy source such as a battery can vary greatly depending on the available energy. Such a variation at the input of the converter involves varying the duty ratio correspondingly, which limits the use of the isolated DC/DC converter in a vehicle.

SUMMARY

Thus, a solution is sought aiming to improve the performances of an isolated DC/DC converter so that it can be used in a motor vehicle.

In order to attain this aim, the invention relates to a voltage converter comprising:
- an isolated DC/DC converter circuit having switches whose opening and closing successions with at least one duty ratio make it possible to transmit energy through the isolated DC/DC converter circuit;
- a circuit for regulating the input voltage of the isolated DC/DC converter circuit;
- the regulating circuit being configured to control the output voltage of the isolated DC/DC converter circuit by modifying the voltage delivered to the isolated DC/DC converter circuit, the duty ratio of the isolated DC/DC converter circuit remaining constant.

By means of the regulating circuit, a desired output voltage value of the isolated DC/DC converter circuit is obtained by adjusting the input voltage of the isolated DC/DC converter circuit. To each desired voltage value at the output of the isolated DC/DC converter circuit corresponds an input voltage value of the isolated DC/DC converter circuit. A desired output voltage value is obtained without modifying the duty ratio of the isolated DC/DC converter circuit. The duty ratio can thus be fixed at a value that enables a maximum yield.

At a given output voltage of the isolated DC/DC converter circuit, the regulating circuit allows operation of the isolated DC/DC converter circuit with a constant duty ratio for any input voltage, in particular within an operating range of the isolated DC/DC converter circuit.

For example, the difference between the minimum value and the maximum value of the input voltage of the converter is between 150 and 500 V; for example, the minimum value of the input voltage is between 150 and 200 V; and the maximum value of the input voltage is between 400 and 500 V, or even between 400 and 650 V.

The duty ratio of the switches of the isolated DC/DC converter circuit thus remains constant taking into account the uncertainty.

In particular, the regulating circuit comprises switches and is such that its duty ratio is adjusted in order to obtain a voltage value at the output of the regulating circuit, that is to say at the input of the isolated DC/DC converter circuit. This voltage value is adjusted to obtain a desired voltage value at the output of the isolated DC/DC converter circuit.

The regulating circuit delivers its output signal at the input of the isolated DC/DC converter circuit. To this effect, the isolated DC/DC converter circuit can be cascaded from the regulating circuit. In particular, the isolated DC/DC converter circuit is connected directly downstream of the regulating circuit.

In particular, the regulating circuit is configured in order to deliver a voltage to the isolated DC/DC converter circuit directly or indirectly from an input voltage of the voltage converter.

The voltage converter can be a direct-direct converter configured for converting a direct input voltage into a direct output voltage.

The voltage converter can be a direct-alternating converter configured for converting an alternating voltage into a direct voltage. Advantageously, the voltage converter then comprises an alternating-direct converter circuit upstream of the regulating circuit, or a direct/alternating converter circuit downstream of the isolated DC/DC converter circuit. By means of appropriate adaptations, the voltage converter can be an alternating-alternating converter.

According to an embodiment, the isolated DC/DC converter circuit is configured so that its duty ratio is substantially equal to 50%. At a duty ratio of 50%, the current at the output of the isolated DC/DC converter circuit presents ripples which are weak, since the ripples of the currents in the magnetizing inductors of the isolated DC/DC converter circuit are compensated.

According to an embodiment, the regulating circuit and the isolated DC/DC converter circuit are in a single module. In particular, the regulating circuit and the isolated DC/DC converter circuit are in the same casing of an electronic module or on the same electronic card of the module.

According to an embodiment, the converter comprises a circuit used for implementing a first loop so as to lock in a setpoint of an electrical parameter of a signal of the regulating circuit based on a difference between the value of the output voltage of the isolated DC/DC converter circuit and an output voltage setpoint of the isolated DC/DC converter circuit, the setpoint of the electrical parameter being such that the regulating circuit delivers to the isolated DC/DC converter circuit an input voltage value corresponding to a respective output voltage value of the isolated DC/DC converter circuit.

According to a variant, the converter comprises a circuit used for implementing a second loop so as to lock in the electrical parameter of the signal of the regulating circuit based on a difference between the value of the electrical parameter and the setpoint of the electrical parameter.

According to a variant, the signal of the regulating circuit is the signal delivered by the regulating circuit, or a signal circulating in the regulating circuit.

According to a variant, the electrical parameter of the signal is its current or its voltage.

Thus, in a variant, the circuit is used for implementing the first loop in such a manner as to lock in the current delivered by the regulating circuit, or a current circulating in the regulating circuit, based on a difference between the value of the output voltage of the isolated DC/DC converter circuit and an output voltage setpoint of the isolated DC/DC converter circuit.

In particular, the circuit of the first loop and/or of the second loop locks in the electrical parameter by controlling switches included in the regulating circuit, in particular by locking in a duty ratio of opening and of closing of the switches.

According to an embodiment, the regulating circuit is a DC/DC converter of the sepic (Single Ended Primary Inductor Converter), Ćuk, buck, boost or buck-boost type.

According to an embodiment, the isolated DC/DC converter circuit comprises at least a first and a second isolation transformer series-connected, the switches making it possible to transmit energy through the isolated DC/DC converter by way of the transformers.

According to an embodiment, the DC/DC converter circuit is configured so that:
  over a first portion of an operating period, the primary winding of the first transformer forms an energy storing inductor, and the primary winding of the second transformer transfers energy toward the secondary winding of the second transformer;
  over a second portion of the operating period, the primary winding of the second transformer forms an energy storing inductor, and the primary winding of the first transformer transfers energy toward the secondary winding of the first transformer.

According to an embodiment, the DC/DC converter circuit is configured so that:
  over a first portion of an operating period, the primary winding of the first transformer forms an inductor enabling a soft switching of the switches, and the primary winding of the second transformer transfers energy toward the secondary winding of the second transformer;
  over a second portion of the operating period, the primary winding of the second transformer forms an inductor enabling a soft switching of the switches, and the primary winding of the first transformer transfers energy toward the secondary winding of the first transformer.

According to an embodiment, a magnetizing inductor of at least one transformer is configured so that, at said duty ratio, a magnetizing current circulating in the transformer enables a soft switching of the switches of the isolated DC/DC converter.

According to an embodiment, the output of the regulating circuit is connected to the isolated DC/DC converter circuit at a branch of the isolated DC/DC converter circuit comprising at least some of the switches of the isolated DC/DC converter circuit.

According to an embodiment, the output of the regulating circuit is connected to a branch of the isolated DC/DC converter circuit comprising said transformers.

According to an embodiment, the switches and the primary windings of the isolated DC/DC converter circuit form a half-bridge structure. Alternatively, the switches and the primary windings of the isolated DC/DC converter circuit form a full-bridge structure, or they have any other configuration enabling the operation of the isolated DC/DC converter circuit.

According to an embodiment, at least one of the switches comprises a parallel-connected capacitor.

The invention also relates to a voltage converter comprising:
  an isolated DC/DC converter circuit having at least one first isolation transformer and switches whose opening and closing successions with at least one duty ratio make it possible to transmit energy through the isolated DC/DC converter by way of said first transformer;
  a circuit for regulating the input voltage of the isolated DC/DC converter circuit;
  the regulating circuit being configured to control the output voltage of the isolated DC/DC converter circuit by modifying the voltage delivered to the isolated DC/DC converter circuit, the duty ratio of the isolated DC/DC converter circuit remaining constant, and
  in said converter, the output of the regulating circuit is connected to a branch of the isolated DC/DC converter circuit comprising said first transformer.

The converter according to this invention can comprise any of the above-described steps that are compatible with it.

In particular, according to an embodiment, the isolated DC/DC converter circuit comprises at least the first isolation transformer and a second isolation transformer series-connected to the first transformer, the switches making it possible to transmit energy through the isolated DC/DC converter by way of said transformers, and the output of the regulating circuit being connected to a branch of the isolated DC/DC converter circuit comprising said transformers. In this embodiment, the at least one first isolation transformer is replaced by at least two series-connected isolation transformers.

According to an embodiment, the branch of said first transformer is connected to a midpoint of the switches, and said regulating circuit is connected to said branch of the first transformer at a point different from the point of connection of the branch to the midpoint of the switches. In particular, the regulating circuit is connected between the first transformer and a capacitor connected, on the one hand, to the transformer, and, on the other hand, to a ground of the voltage converter.

This embodiment is compatible with the preceding one. In particular, the branch comprising the two series-connected isolation transformers is connected to a midpoint of the switches, and said regulating circuit is connected to said branch at a point different from the point of connection of the branch to the midpoint of the switches. In particular, the regulating circuit is connected between the second transformer and a capacitor connected, on the one hand, to the series of transformers, and, on the other hand, to a ground of the voltage converter.

The invention moreover concerns a voltage conversion device comprising at least two voltage converters according to the invention, the converters being interlaced; and in which the regulating circuits are configured to operate with a phase shift of $2\pi/n$, and the isolated DC/DC converter circuits are configured to operate with a phase shift of $\pi/n$, n being the number of interlaced voltage converters.

According to an embodiment, the voltage converters share a single circuit used for implementing the first loop, so that the regulating circuits receive the same setpoint.

The invention also relates to a voltage conversion method comprising the steps consisting in:
supplying at least one isolated DC/DC converter circuit having switches whose opening and closing successions with at least one duty ratio make it possible to transmit energy through the isolated DC/DC converter; and a circuit for regulating the input voltage of the isolated DC/DC converter circuit;
controlling the output voltage of the isolated DC/DC converter circuit by modifying the voltage delivered to the isolated DC/DC converter, the duty ratio of the isolated DC/DC converter circuit remaining constant.

According to an embodiment, the duty ratio of the isolated DC/DC converter circuit is substantially equal to 50%.

According to an embodiment, the control of the output voltage of the isolated DC/DC converter circuit comprises a first loop locking in the setpoint of an electrical parameter of a signal of the regulating circuit based on a difference between the value of the output voltage of the isolated DC/DC converter circuit and an output voltage setpoint of the isolated DC/DC converter circuit, the setpoint of the electrical parameter being such that the isolated DC/DC converter circuit receives an input voltage having a value corresponding to a respective output voltage value of the isolated DC/DC converter circuit.

According to an embodiment, the method includes the supplying of the isolated DC/DC converter circuit comprising at least a first and a second isolation transformer series-connected; and:
over a first portion of an operating period of the isolated DC/DC converter circuit, the primary winding of the first transformer forms an energy storing inductor, and the primary winding of the second transformer transfers energy toward the secondary winding of the second transformer;
over a second portion of the operating period of the isolated DC/DC converter circuit, the primary winding of the second transformer forms an energy storing inductor, and the primary winding of the first transformer transfers energy toward the secondary winding of the first transformer.

According to an embodiment, the method includes the supplying of the isolated DC/DC converter circuit comprising at least a first and a second isolation transformer series-connected; and:
over a first portion of an operating period of the isolated DC/DC converter circuit, the primary winding of the first transformer forms an inductor enabling a soft switching of the switches, and the primary winding of the second transformer transfers energy toward the secondary winding of the second transformer;
over a second portion of the operating period of the isolated DC/DC converter circuit, the primary winding of the second transformer forms an inductor enabling a soft switching of the switches, and the primary winding of the first transformer transfers energy toward the secondary winding of the first transformer.

According to an embodiment, the control of the output voltage of the isolated DC/DC converter circuit comprises the modification of a voltage delivered by the regulating circuit to a branch of the isolated DC/DC converter circuit comprising at least some of the switches of the isolated DC/DC converter circuit.

According to an embodiment, the control of the output voltage of the isolated DC/DC converter circuit comprises the modification of a voltage delivered by the regulating circuit to a branch of the isolated DC/DC converter circuit comprising the transformers of the isolated DC/DC converter circuit.

According to an embodiment, the method comprises the supplying of a plurality of interlaced isolated DC/DC converters; and
the isolated DC/DC converter circuits operate with a phase shift of $\pi/n$, n being the number of interlaced converters; and
the regulating circuit(s) operate with a phase shift of $2\pi/n$.

According to an embodiment, the control of the output voltage of the isolated DC/DC circuits is implemented with the same setpoint delivered by a single regulating circuit.

The invention also relates to a voltage conversion method comprising the steps consisting in:
supplying at least one isolated DC/DC converter circuit having switches whose opening and closing successions with at least one duty ratio make it possible to transmit energy through the isolated DC/DC converter; at least one first isolation transformer; and a circuit for regulating the input voltage of the isolated DC/DC converter circuit;
controlling the output voltage of the isolated DC/DC converter circuit by modifying the voltage delivered to the isolated DC/DC converter circuit, the duty ratio of the isolated DC/DC converter circuit remaining constant, said step comprising the modification of a voltage delivered by the regulating circuit to a branch of the isolated DC/DC converter circuit comprising the first transformer of the isolated DC/DC converter circuit.

The method according to this invention can comprise any of the above-described steps that are compatible with it.

BRIEF DESCRIPTION OF THE DRAWINGS

The invention will be better understood in reference to the drawings, in which.

DETAILED DESCRIPTION

Figure 1:
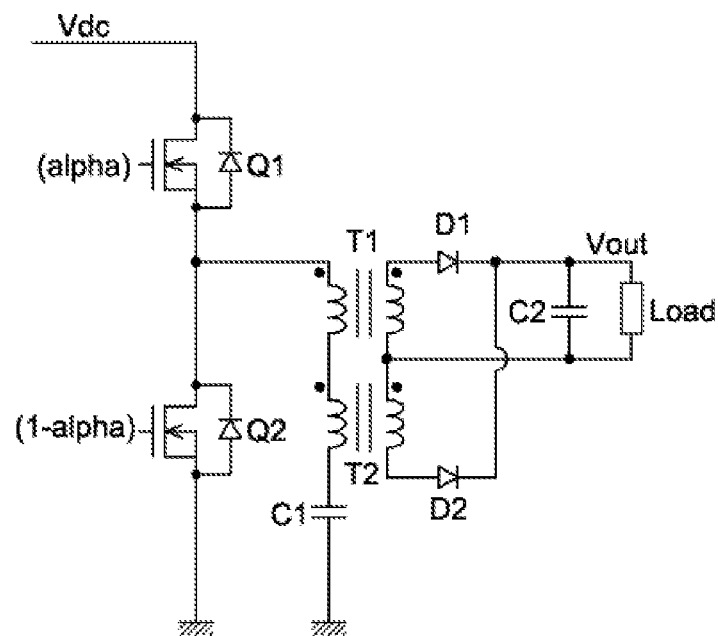
FIG. 1 illustrates an example of an isolated DC/DC converter according to the prior art.
Figure 2:
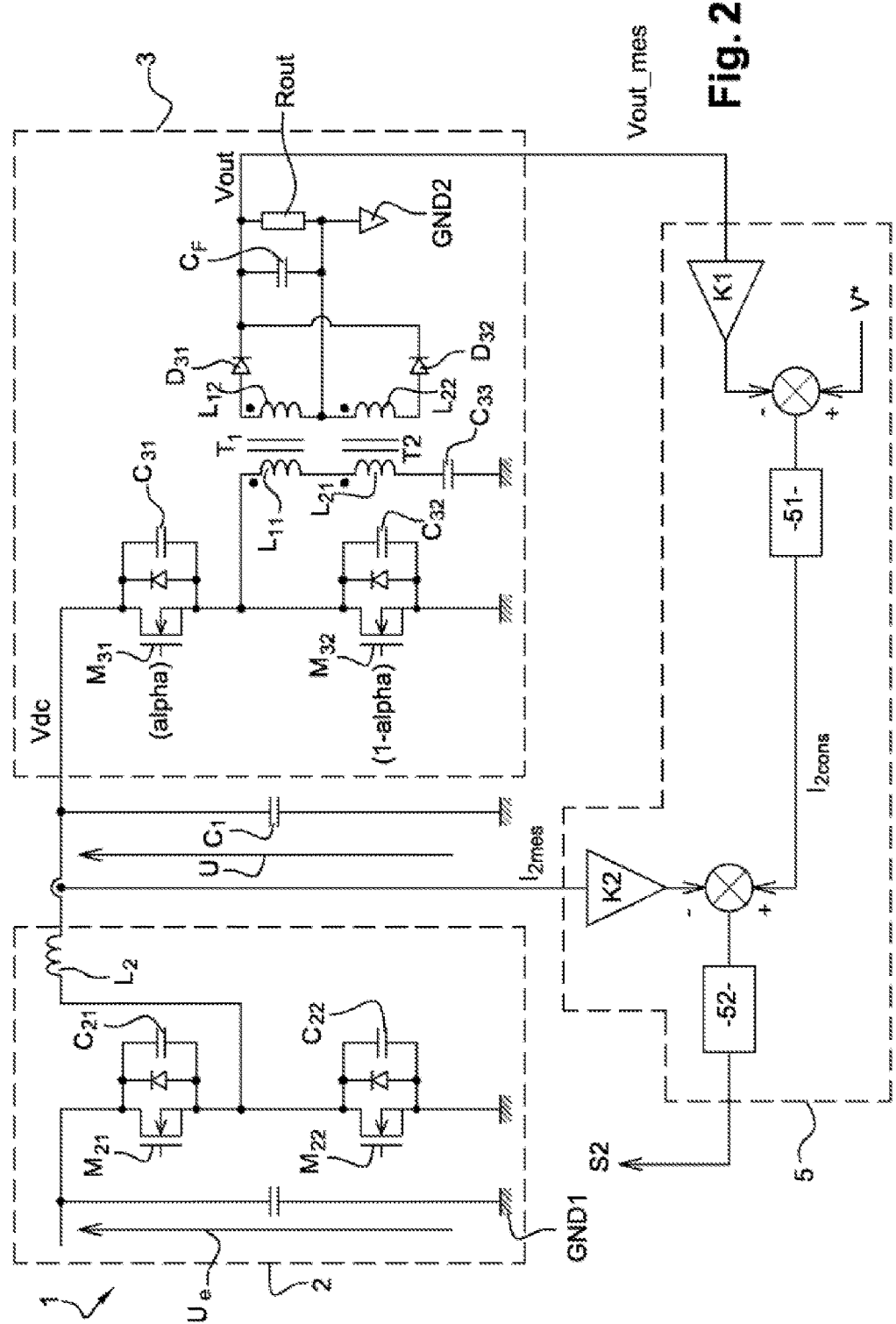
FIGS. 2 to 7 each illustrate an example of a DC/DC voltage converter according to the invention.

The voltage converter will be better understood in reference to FIG. 2.

The converter 1 comprises an isolated DC/DC converter circuit 3 and a circuit 2 for regulating the input voltage of the isolated DC/DC converter circuit 3. The circuits 2, 3 comprise switches M21, M22, M31, M32 whose opening and closing successions make it possible to control the output signal of these circuits. These switches can be transistors such as MOSFET or IGBT transistors or others. The circuits 2, 3 can be produced from a semiconductor material such as silicon (Si), gallium nitride (GaN), silicon carbide (SiC) or any other semiconducting material.

Figure 3:
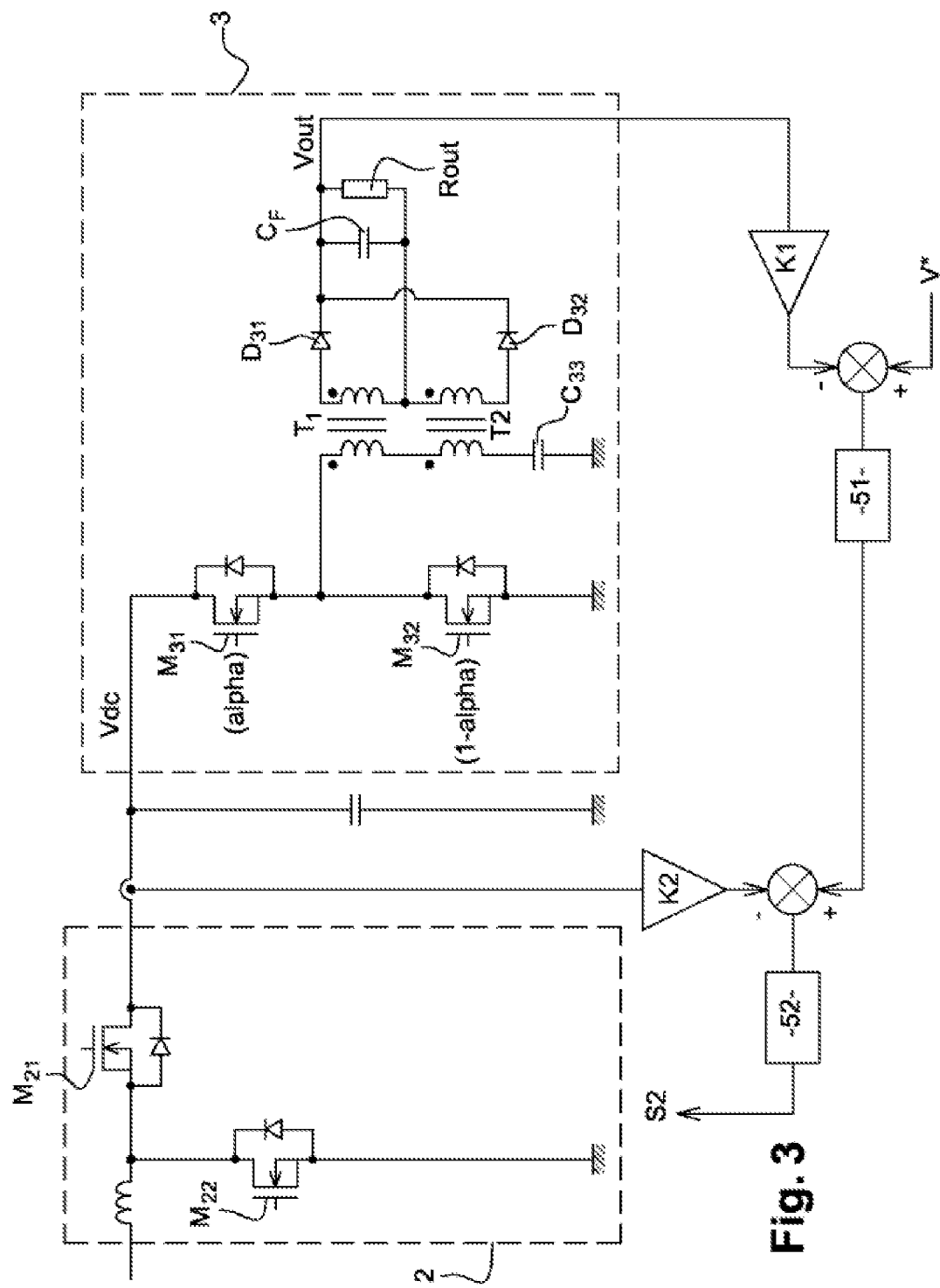
Figure 4:
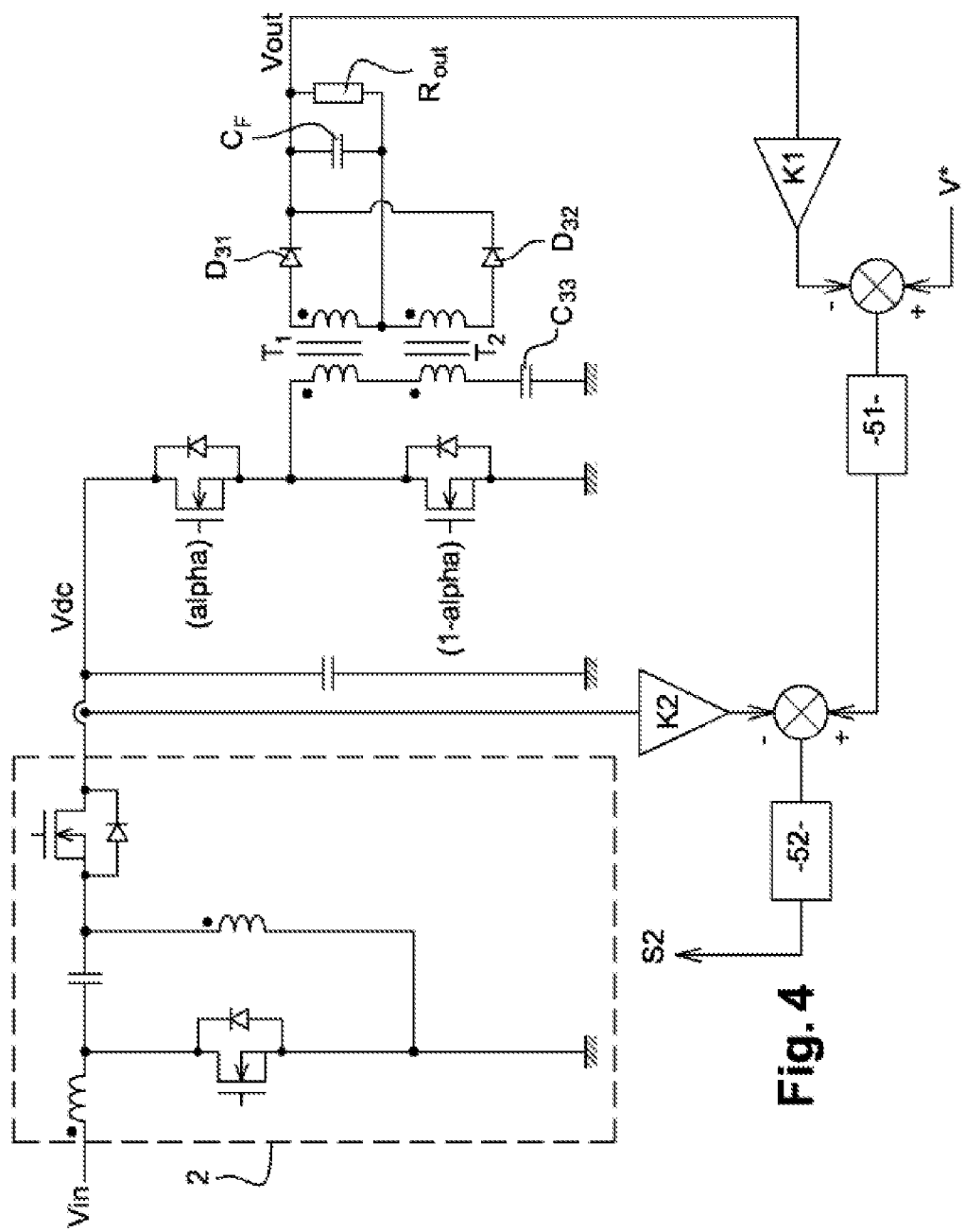

In the example considered, the regulating circuit 2 is a DC/DC buck converter; however, it could be another DC/DC converter type, as illustrated in FIGS. 3 and 4. The regulating circuit 2 comprises two switches M21, M22 series-connected. The switch M21, referred to as upper switch, is connected to the upper terminal of a voltage source (not represented). The switch M22, referred to as lower switch, is connected to the lower terminal of the voltage source. This lower terminal corresponds, in particular, to a first ground GND1 of the converter 1. Each switch M21, M22 can comprise a transistor parallel-connected to a free wheeling diode.

Each switch M21, M22 comprises a capacitor C21, C22 parallel-connected. These capacitors C21, C22 are used to do zero voltage switching or ZVS when the switches are opened. During the opening of a switch M21, M22, the energy stored in an inductor is recovered in order to discharge and recharge the capacitor C21, C22 which is at the terminals of the switch. Once the voltage is close to 0 V, the switch is actuated, thus bringing about zero voltage switching, which greatly reduces the switching losses.

An inductor L2 has a first terminal connected to the midpoint of the two switches M21, M22, and a second terminal connected to the input of the isolated DC/DC converter circuit 3.

A capacitor C1 is connected between the second terminal of the inductor L2 and the first ground GND1 of the converter 1. This capacitor C1 makes it possible, for example, to produce the interface between the circuits 2, 3.

The isolated DC/DC converter circuit 3 comprises two series-connected, preferably identical, switches M31, M32. The switches M31, M32 comprise diodes and capacitors C31, C32 similar to the diodes and to the capacitors C21, C22 described above for the switches M21, M22. The midpoint between the two switches M31, M32 is connected to a branch comprising two series-connected isolation transformers T1, T2. Each transformer T1, T2 comprises a primary winding L11, L21 and a secondary winding L12, L22. The primary windings L11, L21 and the secondary windings L12, L22 respectively are series-connected. The midpoint of the switches M31, M32 is connected to the primary windings L11, L21. A capacitor C33 is provided between the transformers T1, T2 and the first ground GND1. The secondary windings L12, L22 are series-connected with their midpoint connected to a second ground GND2 of the voltage converter 1.

Diodes D31, D32 are connected to the secondary windings L12, L22 in order to rectify the signal originating from the transformers T1, T2. For this purpose, one diode D31 has its anode connected to a terminal of one secondary winding L12, and the other diode D32 has its anode connected to a terminal of the other secondary winding L22, these terminals being different from the midpoint of the two secondary windings L12, L22. The diodes D31, D32 could be replaced advantageously by switches, in particular transistors such as MOSFET or IGBT transistors or others, in order to obtain, for example, a synchronous rectifying at the output of the transformers T1, T2. For applications with high current in the secondary winding, the use of MOSFET instead of the diodes makes it possible to improve the overall yield of the converter 1.

The output of the isolated DC/DC converter circuit 3 is taken between the terminal of the diodes D31, D32 which is not connected to the secondary windings L12, L22 and which is shared by the two diodes D31, D32 and the second ground GND2.

The voltage converter 1 includes a capacitor CF for filtering the signal delivered by the isolated DC/DC converter circuit 3.

The switches M31, M32 of the isolated DC/DC converter circuit 3 have a duty ratio that makes it possible to transfer energy through the transformers T1, T2.

Over a first portion of an operating period, the switch M31 is closed, and the switch M32 is open. The primary winding L11 of the first transformer T1 forms an inductor enabling a soft switching of the switches M31, M32, and the primary winding L21 of the second transformer T2 transfers energy toward the secondary winding L22 of the second transformer T2.

Over a second portion of the operating period, the primary winding L21 of the second transformer T2 forms an inductor enabling a soft switching of the switches M31, M32, and the primary winding L11 of the first transformer T1 transfers energy toward the secondary winding L12 of the first transformer T1. The durations of the first and second operating portions are defined by the duty ratio $\alpha$ of the switches M31, M32.

The switches M31, M32 operate with a duty ratio $\alpha$ which does not vary, that is to say which remains constant over time. During the operation of the converter 1, the output voltage Vout of the isolated DC/DC converter circuit 3 is controlled by the voltage delivered by the regulating circuit 2, that is to say at the input of the isolated DC/DC converter circuit 3. To this effect, the converter 1 comprises an actuation unit 5 for the regulating circuit 2. The actuation unit 5 delivers a pulse width modulation or PWM signal S2 which actuates the opening and the closing of the switches M21, M22 of the regulating circuit 2 in order to control the electrical signal delivered by the regulating circuit 2. The switches M21, M22 are actuated so that the voltage delivered at the input of the isolated DC/DC converter circuit 3, that is to say at the output of the regulating circuit 2, makes it possible to obtain a desired voltage value at the output of the isolated DC/DC converter circuit 3. Thus, in contrast to the prior art, it is not necessary to vary the duty ratio $\alpha$ of the isolated DC/DC converter circuit 3. The isolated DC/DC converter circuit 3 can thus operate at its most advantageous duty ratio, in particular at 50%.

The voltage stresses at the terminals of the diodes D31, D32 are a function of the duty ratio $\alpha$ and are given by the following expressions:

$$V(D31) = V\text{out}/(1-\alpha) \text{ and } V(D32) = V\text{out}/\alpha$$

The duty ratio α is preferably equal to 50%. Thus, the voltage stresses at the terminals of the two diodes D31, D32 are equal, the wear is the same between the diodes. In addition, at a duty ratio of 50%, the current ripples due to the magnetizing inductors of the transformers T1, T2 are compensated between one another. Thus, the current in the secondary windings L12, L22 is direct.

More particularly, the magnetizing inductors of the transformers T1, T2 are such that, at constant duty ratio, equal to 50% in particular, a magnetizing circuit circulating in the transformers T1, T2 enables a soft switching of the switches M31, M32 of the isolated DC/DC converter 3.

In particular, when the input voltage Ue of the voltage converter 1 varies, the regulating circuit 2 makes it possible to ensure that the voltage U at the input of the isolated DC/DC converter circuit 3 keeps a value that makes it possible to obtain the desired output voltage Vout. Thus, if the input voltage Ue of the converter 1 changes value, the actuation unit 5 correspondingly modifies the actuation of the duty ratios of the switches M21, M22 in order to maintain the voltage U at the output of the regulating circuit 2, that is to say at the input of the isolated DC/DC converter 3. This is particularly advantageous in an electric vehicle, wherein the change in the charge of a battery can vary over time.

More particularly, the actuation unit 5 implements a first loop locking in the current delivered by the regulating circuit 2 based on a difference between the value Vout_mes of the output voltage of the isolated DC/DC converter circuit 3 and a desired voltage Vout at the output of the isolated DC/DC converter circuit 3. To this effect, the actuation unit 5 receives the voltage Vout_mes measured at the output of the isolated DC/DC converter circuit 3, possibly multiplied by a gain K1. The actuation unit 5 then compares a voltage setpoint V* with a voltage Vout_mes measured. The voltage setpoint V* corresponds to the desired voltage Vout at the output of the isolated DC/DC converter circuit 3. As a function of the result of the comparison, a controller 51 delivers a current setpoint I2cons to the regulating circuit 2, so as to obtain an expected voltage U at the output of the regulating circuit 2, that is to say at the input of the isolated DC/DC converter circuit 3. The current setpoint I2cons is such that the regulating circuit 2 delivers to the isolated DC/DC converter circuit 3 the value of the input voltage U corresponding to the expected respective voltage value Vout at the output of the isolated DC/DC converter circuit 3.

The first control loop could be implemented by any other means. For example, the first loop could directly lock in the voltage U delivered by the regulating circuit 2.

In addition, the actuation unit 5 can ensure a protection of the isolated DC/DC converter circuit 3. For example, in the case of a short circuit at the output load Rout, the actuation unit 5 can protect the isolated DC/DC converter circuit 3 by acting on the actuation signals S2 of the regulating circuit 2 in such a manner as to cancel the input voltage of the isolated DC/DC converter circuit 3, in order to protect it.

The current setpoint I2cons can be transmitted directly to a controller 52 which delivers to the regulating circuit 2 the PWM signal S2 based on the current setpoint I2cons. However, the actuation unit 5 can implement a second loop which locks in the current delivered by the regulating circuit 2 based on a difference between the value I2mes of the current delivered by the regulating circuit 2 and the current setpoint I2cons. In particular, the actuation unit 5 compares the current setpoint I2cons originating from the first loop with the current I2mes measured at the output of the regulating circuit 2. The current I2cons is optionally multiplied by a gain K2 before the comparison. As a function of the result of this comparison, the controller 52 determines the signal S2 for actuation of the duty ratio of the switches M21, M22 of the regulating circuit 2, so as to adjust the current delivered by the regulating circuit 2 in order to obtain the expected current I2cons; and thus obtain a signal having the expected voltage U at the output of the regulating circuit 2, that is to say at the input of the isolated DC/DC converter circuit 3. The second control loop could be produced by any other means making it possible to obtain, at the output of the regulating circuit 2, the voltage U in order to achieve the voltage Vout at the output of the isolated DC/DC converter circuit 3. In particular, a voltage loop could be used. However, the current loop is easier to use, since, with small signal, the current loop makes it possible to have a first order transfer function, whereas the voltage loop is of second order. In addition, the voltage converter 1 could use the first loop without using the second loop.

The converter 1 according to the invention can be designed to cover an operating range. The operating range corresponds to an input voltage Ue of the converter 1 between a minimum value $Ue_{min1}$ and a maximum value $Ue_{max1}$; and an output voltage Vout between a minimum value $Vout_{min1}$ and a maximum value $Vout_{max1}$. For example, the input voltage Ue is between 170 and 450 V; and the target voltage Vout at the output of the isolated DC/DC converter circuit is between 12 and 16 V. For example, the minimum value $Vout_{min1}$ of the output voltage is between 8 and 14 V, and the maximum value $Vout_{max1}$ of the output voltage is between 15 and 16 V.

In the sample of FIG. 2, the regulating circuit 2 is a buck converter. The converter 1, in particular the regulating circuit 2, is then configured so as to be able to deliver the maximum output voltage $Vout_{max1}$ with the minimum voltage $Ue_{min1}$.

The examples of converters illustrated in FIGS. 3 and 4 are similar to the example of FIG. 2, but differ as to the regulating circuit 2.

FIG. 3 illustrates an example of a converter in which the regulating circuit 2 is a boost circuit which in itself is known. The converter 1, in particular the regulating circuit 2, is then configured so as to be able to deliver the minimum output voltage $Vout_{min1}$ with the maximum input voltage $Ue_{max1}$.

FIG. 4 illustrates another example of a converter in which the regulating circuit 2 is a boost-buck circuit which in itself is known. In this example, the regulating circuit 2 can buck or boost the voltage, which facilitates the use of the regulating circuit 2.

In the examples illustrated in FIGS. 2 to 4, the output of the regulating circuit 2 is connected to the isolated DC/DC converter circuit 3 at the branch of the isolated DC/DC converter circuit 3 which includes the switches M31, M32.

Figure 5:
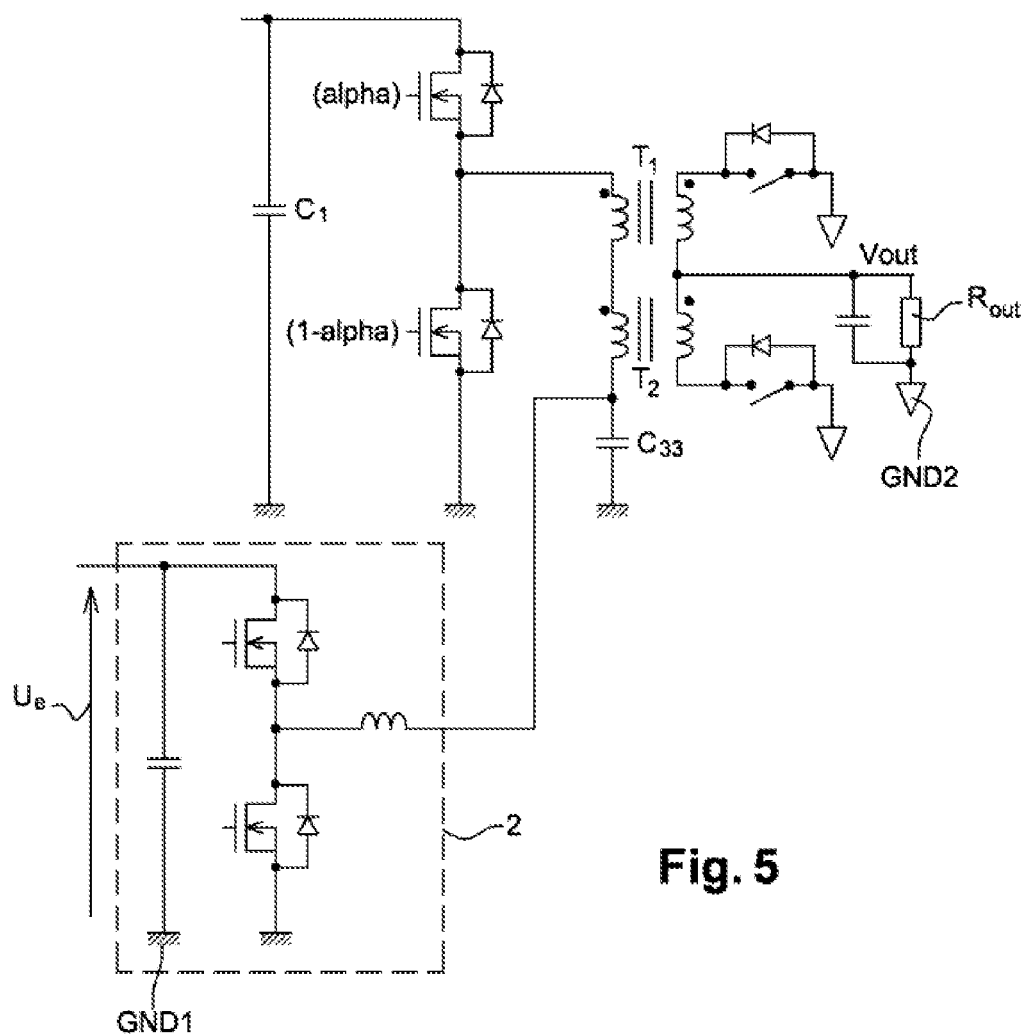
Figure 6:
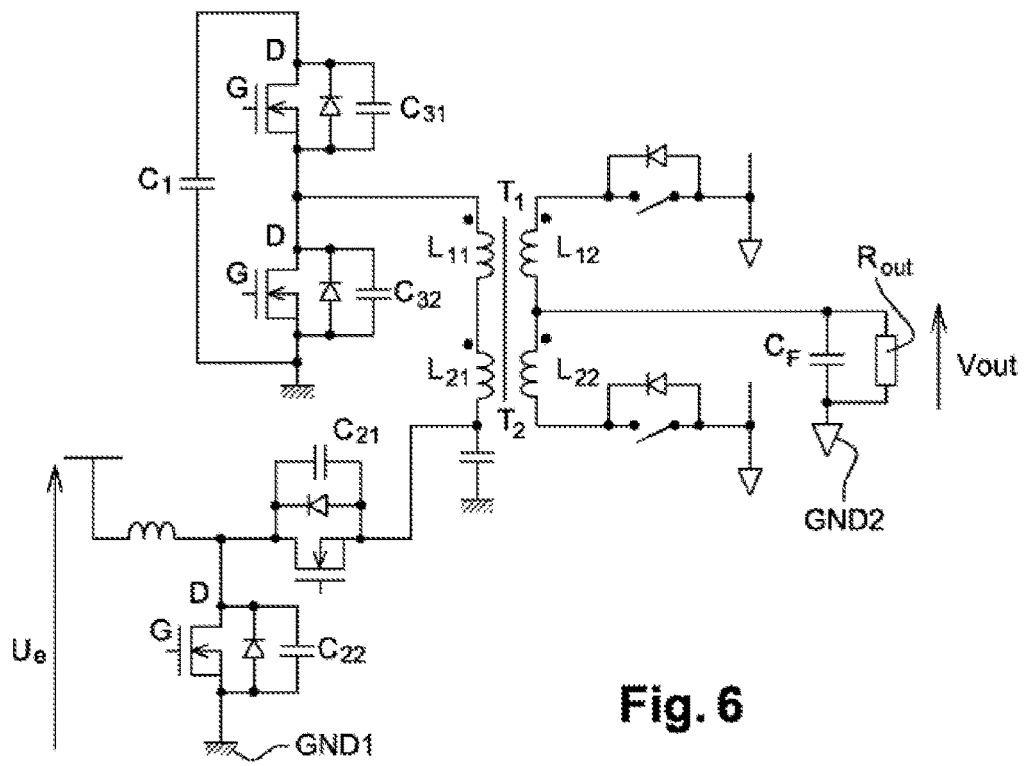
Figure 7:
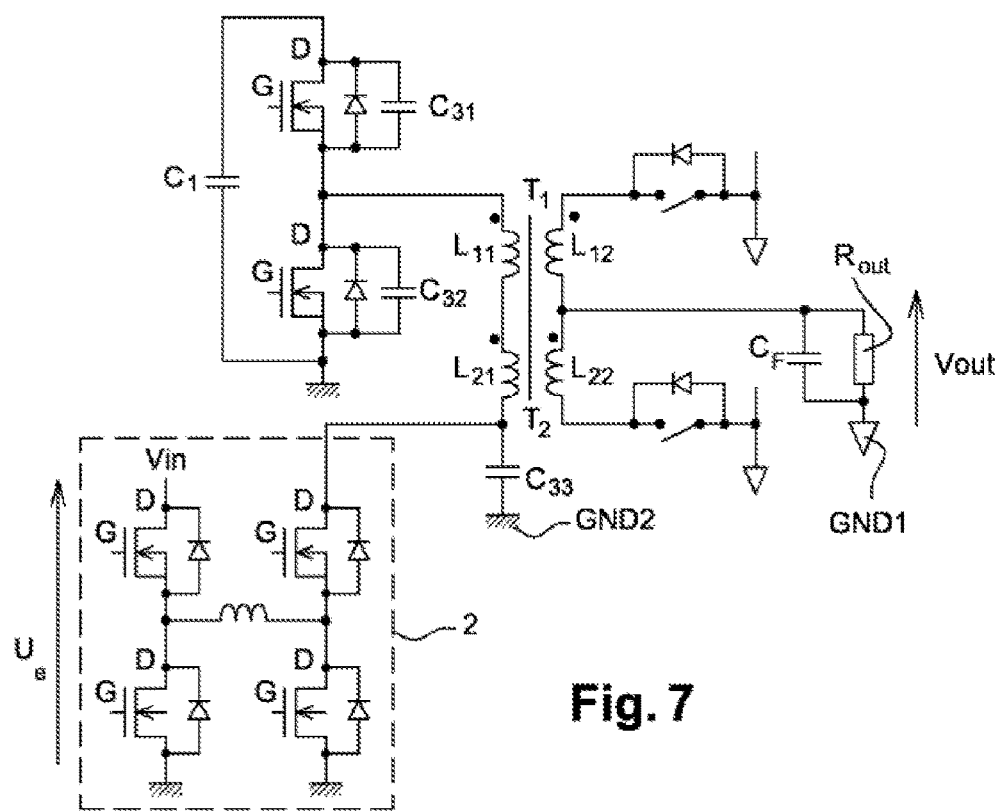

The examples illustrated in FIGS. 5 to 7 are identical to the examples of FIGS. 2 to 4, except that, in FIGS. 5 to 6, the output of the regulating circuit 2 is connected to the branch of the isolated DC/DC converter circuit 3 which comprises the transformers T1, T2. In particular, the regulating circuit 2 is connected between the transformers T1, T2 and the capacitor C33.

In addition, the diodes D31, D32 are replaced by switches; and the upper output is connected to the midpoint of the secondary windings L12, L22, while in the preceding examples, the upper output is connected to the common terminal of the diodes D31, D32. However, the examples illustrated in FIGS. 5 to 7 could be identical to the examples of FIGS. 2 to 4 insofar as these features are concerned.

The examples of converters 1 can be configured to operate over a first operating range of the converter 1 with a duty ratio of the isolated DC/DC converter circuit 3 which is constant, and over a second operating range of the converter 1 with a duty ratio that is variable. This is particularly advantageous in order to obtain an input voltage Ue range and/or an output voltage Vout range which is/are larger in comparison to an operation in which the duty ratio of the isolated DC/DC converter circuit is always constant.

Figure 8:
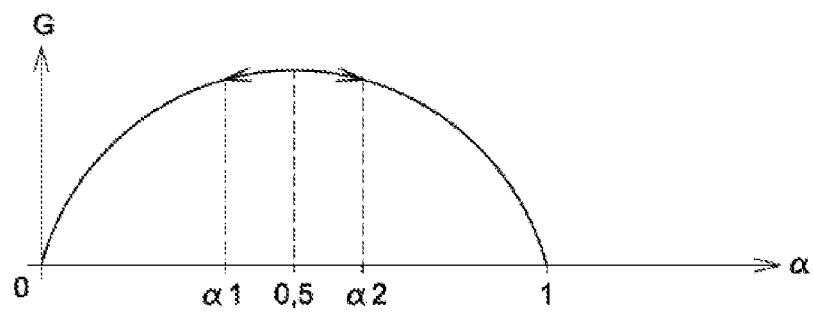
FIG. 8 represents a graph of the gain as a function of the duty ratio in an isolated DC/DC converter according to the invention.

In FIG. 8, a graph represents the gain G of the isolated DC/DC converter circuit 3 of the converter 1 illustrated in FIG. 3, as a function of the duty ratio $\alpha$ of the isolated DC/DC converter circuit 3. The gain G corresponds to the ratio of the voltage Vout at the output of the isolated DC/DC converter circuit 3 over the voltage U at the input of the isolated DC/DC converter circuit 3. The relation between the gain G and the duty ratio $\alpha$ is defined by:

$$G + \frac{Vout}{m \times U} = \alpha \times (1 - \alpha),$$

where m is the transformer ratio of a transformer T1, T2.

For example, the isolated DC/DC converter circuit 3 operates with a constant duty ratio equal to 0.5. The operating range defined above corresponds to the first operating range. If one wishes to reach values outside of the first operating range, the duty ratio $\alpha$ of the isolated DC/DC converter circuit 3 can be modified to reach the desired value. Thus, the converter 1 has a total operating range which is broadened with respect to the embodiments described above.

For example, in the first operating range, the input voltage Ue is between 170 and 450 V; and the target voltage Vout at the output of the isolated DC/DC converter circuit 3 is between 12 and 16 V. The second operating range is defined by a lower input voltage threshold $Ue_{min2}$ equal to 450 V and an upper output voltage threshold $Vout_{max2}$ equal to 12 V. If, when the input voltage is equal to 450 V, one wishes to reach a target output voltage value of less than 12 V, for example, 9 V, the target value cannot be reached by modifying the duty ratio of the regulating circuit 2, since the circuit 2 is a boost converter that can only raise the input voltage Ue. On the other hand, by modifying the duty ratio $\alpha$ of the isolated DC/DC converter circuit, the gain of the isolated DC/DC converter circuit decreases, which makes it possible to increase the output voltage Vout of the isolated DC/DC converter circuit, and consequently makes it possible to reach the target value, for example, 9 V. To this effect, the duty ratio $\alpha$ of the isolated DC/DC converter circuit 3 can be decreased to a lower value $\alpha1$ of less than 0.5 or to a value $\alpha2$ greater than 0.5.

For power applications, it is advantageous to interlace several of the converters 1 illustrated in FIGS. 2 to 7. It is possible to connect the converters 1 in parallel and to interlace them in order to limit the current ripples at the output and reduce the value of the filtering capacitor CF at the output of the isolated DC/DC converter circuit 3. In each converter 1, thanks to the regulating circuit 2, the duty ratio $\alpha$ of the isolated DC/DC converter circuit 3 remains constant. Or, in each converter 1, the duty ratio $\alpha$ of the isolated DC/DC converter circuit 3 remains constant over a first portion of the operating range and varies over a second portion of the operating range as described above.

Figure 9:
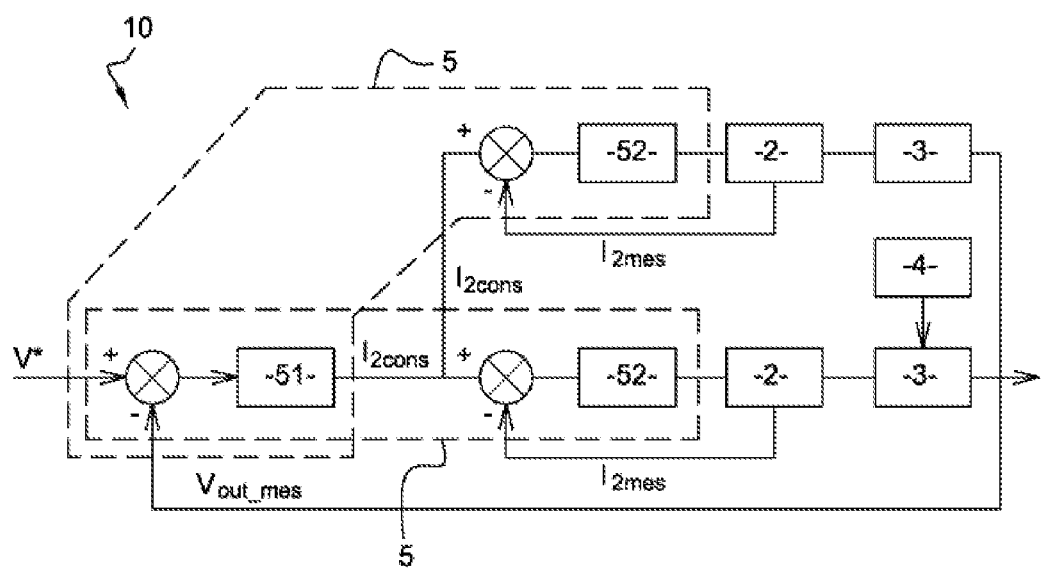
FIG. 9 illustrates an example of the actuation process of a conversion device comprising an interlacing of converters according to the invention.

FIG. 9 illustrates an operation of a conversion device 10 which comprises an interlacing of converters 1. Preferably, the first control loop is common to all the converters 1. Thus, the regulating circuits 2 receive the same current setpoint I2cons. To this effect, the device 10 can comprise a single controller 51 delivering a single current setpoint I2cons to all the regulating circuits 2. Thus, a current balancing between the voltage converters 1 is ensured.

Preferably, the converters 1 operate with a phase shift. In particular, the regulating circuits 2 operate with a phase shift of $2\pi/n$, where n is the number of interlaced converters 1, which makes it possible to limit the fluctuations at the output of the device 10 and the problems of electromagnetic compatibility. The isolated DC/DC converter circuits 3 operate with a phase shift of $\pi/n$ which makes it possible to limit the ripples at the output of the device 10.

The invention is not limited to the examples described. In particular, the voltage loops can be replaced by current loops, conversely the current loops can be replaced by voltage loops. In addition, the isolated DC/DC converter circuit 3 was described with a half-bridge structure. However, the isolated DC/DC converter circuit 3 could have a full-bridge structure or any other structure making it possible to implement the isolated DC/DC converter function.

Other examples of isolated DC/DC converters are similar to those described above, except for the following difference. Over the first portion of the operating period, the primary winding L11 of the first transformer T1 forms an energy storing inductor, and the primary winding L21 of the second transformer T2 transfers energy toward the secondary winding L22 of the second transformer T2. Over the second portion of the operating period, the primary winding L21 of the second transformer T2 forms an energy storing inductor, and the primary winding L11 of the first transformer T1 transfers energy toward the secondary winding L12 of the first transformer T1. In these examples of isolated DC/DC converters, a magnetizing current circulating in the transformers T1, T2 does not necessarily make it possible to achieve a soft switching of the switches M31, M32 of the isolated DC/DC converter.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:
1. A voltage converter comprising:
an isolated DC/DC converter circuit having at least one first isolation transformer and switches whose opening and closing successions with at least one duty ratio make it possible to transmit energy through the isolated DC/DC converter circuit by way of said at least one first isolation transformer;
a circuit for regulating an input voltage of the isolated DC/DC converter circuit;
the circuit for regulating the input voltage of the isolated DC/DC converter circuit being configured to control an output voltage of the isolated DC/DC converter circuit by modifying a voltage delivered to the isolated DC/DC converter circuit, a duty ratio of the isolated DC/DC converter circuit remaining constant, and
in said voltage converter, an output of the circuit for regulating the input voltage of the isolated DC/DC converter circuit is connected to a branch of the isolated DC/DC converter circuit comprising said at least one first isolation transformer.

2. The voltage converter according to claim 1, in which the isolated DC/DC converter circuit is configured so that the at least one duty ratio is substantially equal to 50%.

3. The voltage converter according to claim 1, in which the circuit for regulating the input voltage of the isolated DC/DC converter circuit and the isolated DC/DC converter circuit are in a single module.

4. The voltage converter according to claim 1, wherein the circuit for regulating the input voltage of the isolated DC/DC converter circuit includes a first loop so as to lock in a setpoint of an electrical parameter of a signal of the circuit for regulating the input voltage of the isolated DC/DC converter circuit based on a difference between a value of the output voltage of the isolated DC/DC converter circuit and an output voltage setpoint of the isolated DC/DC converter circuit, the setpoint of the electrical parameter being configured so the circuit for regulating the input voltage of the isolated DC/DC converter circuit delivers to the isolated DC/DC converter circuit an input voltage value corresponding to a respective output voltage value of the isolated DC/DC converter circuit.

5. The voltage converter according to claim 1, in which the circuit for regulating the input voltage of the isolated DC/DC converter circuit is a DC/DC converter of a single ended primary inductor converter, Ćuk, buck, boost or boost-buck type.

6. The voltage converter according to claim 1, in which the branch comprising the at least one first isolation transformer is connected to a midpoint of the switches, and said circuit for regulating the input voltage of the isolated DC/DC converter circuit is connected to said branch comprising the at least one first isolation transformer at a point different from the midpoint of the switches to which the branch comprising the at least one first isolation transformer is connected.

7. The voltage converter according to claim 1, in which the isolated DC/DC converter circuit comprises at least the first isolation transformer and a second isolation transformer series connected to the first transformer, the switches making it possible to transmit energy through the isolated DC/DC converter by way of said transformers, and the output of the circuit for regulating the input voltage of the isolated DC/DC converter circuit being connected to the branch of the isolated DC/DC converter circuit comprising said first and second isolation transformers.

8. The voltage converter according to claim 7, in which the isolated DC/DC converter circuit is configured so that:
over a first portion of an operating period, a primary winding of the first transformer forms an energy storing inductor, and a primary winding of the second transformer transfers energy toward a secondary winding of the second transformer;
over a second portion of the operating period, the primary winding of the second transformer forms an energy storing inductor, and the primary winding of the first transformer transfers energy toward a secondary winding of the first transformer.

9. The voltage converter according to claim 7, in which a magnetizing inductor of at least one of the first and second isolation transformers is configured so that, at said duty ratio, a magnetizing circuit circulating in the at least one of the first and second isolation transformers enables a soft switching of the switches of the isolated DC/DC converter.

10. A device for converting voltage comprising at least two voltage converters according to claim 1, the at least two voltage converters being interlaced; and in which the circuits for regulating the input voltage of the isolated DC/DC converter circuit of the at least two voltage converters are configured to operate with a phase shift of $2\pi/n$, and the isolated DC/DC converter circuits of the at least two voltage converters are configured to operate with a phase shift of $\pi/n$, n being a total number of interlaced voltage converters of the at least two voltage converters.

11. The device according to claim 10, in which the at least two voltage converters share a single circuit used for implementing a first loop locking in a setpoint of an electrical parameter of a signal of the single circuit for regulating the input voltage of the isolated DC/DC converter circuits of the at least two voltage converters based on a difference between a value of the output voltage of the isolated DC/DC converter circuits of the at least two voltage converters and an output voltage setpoint of the isolated DC/DC converter circuit of the at least two voltage converters, so that the regulating circuits receive the same setpoint, the setpoint of the electrical parameter being configured so the circuit for regulating the input voltage of each isolated DC/DC converter circuit of the at least two voltage converters delivers to the isolated DC/DC converter circuit an input voltage value corresponding to a respective output voltage value of the isolated DC/DC converter circuit.

12. A method for converting voltage comprising:
supplying at least one isolated DC/DC converter circuit having switches whose opening and closing successions with at least one duty ratio make it possible to transmit energy through the at least one isolated DC/DC converter circuit; at least one first isolation transformer; and a circuit for regulating an input voltage of the at least one isolated DC/DC converter circuit;
controlling an output voltage of the at least one isolated DC/DC converter circuit by modifying a voltage delivered to the at least one isolated DC/DC converter circuit, the at least one duty ratio of the at least one isolated DC/DC converter circuit remaining constant, wherein modifying the voltage delivered to the at least one isolated DC/DC converter comprises modification of a voltage delivered by the circuit for regulating the input voltage of the at least one isolated DC/DC converter circuit at a branch of the at least one isolated DC/DC converter circuit comprising the first transformer of the at least one isolated DC/DC converter circuit.

13. The method according to claim 12, in which the at least one duty ratio of the at least one isolated DC/DC converter circuit is substantially equal to 50%.

14. The method according to claim 12, in which the control of the output voltage of the at least one isolated DC/DC converter circuit comprises a first loop locking in a setpoint of an electrical parameter of a signal of the circuit for regulating the input voltage of the at least one isolated DC/DC converter circuit based on a difference between a value of the output voltage of the at least one isolated DC/DC converter circuit and an output voltage setpoint of the at least one isolated DC/DC converter circuit, the setpoint of the electrical parameter being configured so the at least one isolated DC/DC converter circuit receives an input voltage having a value corresponding to a respective output voltage value of the at least one isolated DC/DC converter circuit.

15. The method according to claim 12, comprising the supplying of the at least one isolated DC/DC converter circuit, wherein the at least one first isolation transformer comprises series-connected first and second isolation transformers; and in which:

over a first portion of an operating period of the at least one isolated DC/DC converter circuit, a primary winding of the first transformer forms an energy storing inductor, and a primary winding of the second transformer transfers energy toward a secondary winding of the second transformer;

over a second portion of the operating period of the at least one isolated DC/DC converter circuit, the primary winding of the second transformer forms an energy storing inductor, and the primary winding of the first transformer transfers energy toward a secondary winding of the first transformer.

16. The method according to claim 12, comprising supplying a plurality of interlaced isolated DC/DC converters; and in which:

isolated DC/DC converter circuits of the plurality of interlaced isolated DC/DC converters operate with a phase shift of $\pi/n$, n being the number of interlaced converters; and circuits for regulating input voltages of the isolated DC/DC converter circuit of the plurality of interlaced isolated DC/DC converters operate with a phase shift of $2\pi/n$.

17. The method according to claim 16, in which the control of output voltages of the isolated DC/DC converter circuits of the plurality of interlaced isolated DC/DC converters is implemented with a single setpoint delivered by a single circuit for regulating input voltages of the isolated DC/DC converter circuit of the plurality of interlaced isolated DC/DC converters.

18. The converter according to claim 2, in which the circuit for regulating the input voltage of the isolated DC/DC converter circuit and the isolated DC/DC converter circuit are in a single module.

19. The converter according to claim 2, wherein the circuit for regulating the input voltage of the isolated DC/DC converter circuit includes a first loop so as to lock in a setpoint of an electrical parameter of a signal of the circuit for regulating the input voltage of the isolated DC/DC converter circuit based on a difference between a value of the output voltage of the isolated DC/DC converter circuit and an output voltage setpoint of the isolated DC/DC converter circuit, the setpoint of the electrical parameter being configured so the circuit for regulating the input voltage of the isolated DC/DC converter circuit delivers to the isolated DC/DC converter circuit an input voltage value corresponding to a respective output voltage value of the isolated DC/DC converter circuit.

20. The converter according to claim 3, wherein the circuit for regulating the input voltage of the isolated DC/DC converter circuit includes a first loop so as to lock in a setpoint of an electrical parameter of a signal of the circuit for regulating the input voltage of the isolated DC/DC converter circuit based on a difference between a value of the output voltage of the isolated DC/DC converter circuit and an output voltage setpoint of the isolated DC/DC converter circuit, the setpoint of the electrical parameter being configured so the circuit for regulating the input voltage of the isolated DC/DC converter circuit delivers to the isolated DC/DC converter circuit an input voltage value corresponding to a respective output voltage value of the isolated DC/DC converter circuit.

* * * * *